United States Patent [19]

Schauer

[11] Patent Number: 5,679,015

[45] Date of Patent: Oct. 21, 1997

[54] DEVICE FOR THE TRANSMISSION OF SIGNALS BETWEEN TWO TERMINALS

[75] Inventor: Friedrich Schauer, Heroldsberg, Germany

[73] Assignee: Alcatel Kabel AG & Co., Germany

[21] Appl. No.: 542,638

[22] Filed: Oct. 13, 1995

[30] Foreign Application Priority Data

Oct. 15, 1994 [DE] Germany .................. 44 36 972.7

[51] Int. Cl.$^6$ ................................ H01R 35/04
[52] U.S. Cl. ............................ 439/164; 439/15
[58] Field of Search ........................ 439/164, 15

[56] References Cited

U.S. PATENT DOCUMENTS

| | | | |
|---|---|---|---|
| 5,219,460 | 6/1993 | Kato et al. | 439/164 |
| 5,224,871 | 7/1993 | Ida et al. | 439/15 |
| 5,277,604 | 1/1994 | Ida et al. | 439/164 |
| 5,409,389 | 4/1995 | Shibata et al. | 439/164 |

FOREIGN PATENT DOCUMENTS

| | | |
|---|---|---|
| 0417350 | 3/1991 | European Pat. Off. . |
| 4211264 | 10/1992 | Germany . |

*Primary Examiner*—Gary F. Paumen
*Attorney, Agent, or Firm*—Ware, Fressola, Van Der Sluys & Adolphson LLP

[57] ABSTRACT

In a device for the transmission of signals between two terminals (6, 8), at least one of the terminals is movable relative to the other. The terminals (6, 8) are connected by at least one line (10) forming windings. The line is stored in an essentially circular cartridge (K) which comprises a stator supporting one of the terminals, and a rotor supporting the other terminal, which can rotate around its axis and in relation to the stator. The line windings (10) are divided into an internal winding area (12) and an external winding area (11) with different winding directions, between which an approximately U-shaped reversing area (13) is located. A one-piece ring-shaped guide (14) is located between the two winding areas (11, 12) and encompasses the reversing area (13) of the windings; it has reciprocally offset protrusions (15) located at least on the side facing the internal winding area (12), which protrude radially outward around the entire periphery.

10 Claims, 2 Drawing Sheets

DEVICE FOR THE TRANSMISSION OF SIGNALS BETWEEN TWO TERMINALS

BACKGROUND OF THE INVENTION

The invention concerns a device for the transmission of signals between two terminals, at least one of which is moveable in relation to the other. The terminals are interconnected by a winding line. Further lines can be connected between the terminals. The line is stored in an essentially circular cassette comprising a stator supporting one of the terminals and a rotor supporting the other terminal. The rotor can rotate around its axis and in relation to the stator, where the line windings are divided into an internal winding area and an external winding area running in different directions, between which an approximately U-shaped reversing area is located. A ring-shaped guide is located between the two winding areas and contains the reversing area for the windings. The guide can move in the peripheral direction of the cartridge and, at least its internal periphery, is able to receive the turns of the internal winding area (DE-OS 42 11 264).

Such a device is necessary for example for the transmission of a signal to trigger the impact protection "airbag" in a motor vehicle. It is located in the steering wheel of a motor vehicle and transmits an electrical or an optical signal. In the sense of the invention, a "line" can therefore be an electrical or an optical line. The transmission of a signal between fixed and mobile parts of the motor vehicle is a significant problem for this device. The sliding contacts or slip rings which transmit the power in such instances have been known for a long time, but are subject to wear and are disadvantageous because of the fluctuating transitory resistances, particularly at low current intensities.

Electrical current is used to transmit signals with the known device in EP-OS 0 417 350. The transmission of current takes place through a flat ribbon line which coils around a spring-retracting coil formed in a cassette. With the relative rotation of the two terminals interconnected by the flat ribbon line, the coiled flat ribbon line "breathes" like the spring of a watch. In one direction of rotation, the windings of the coiled flat ribbon line retract into a smaller diameter. In the other direction they return to a larger diameter. Thus, the flat ribbon line can partake in the rotations of a steering wheel without interrupting the signal path. A correspondingly long flat ribbon line is required to provide a sufficient number of rotations in both directions, and is stored in a large number of turns in the cassette. In principle, this device is useable in practice. However, difficulties can arise, particularly at low current intensities, because of the long length of the line and its relatively high ohmic resistance.

The length of the line between the two terminals in the DE-OS 42 11 264 device mentioned in the beginning is significantly shorter than in the device described in EP-OS 0 417 350. The coiled line is subdivided into internal and external winding areas, wherein the coils are wound in different directions. The two winding areas are interconnected by an approximately U-shaped reversing area.

A ring-shaped guide, which encompasses the reversing area and is able to move in the peripheral direction of the cassette, is located between the two winding areas. It moves by means of the coiled line or its reversing area when the rotor of the cassette rotates. The guide contains several rollers, which are offset with respect to each other and rotate around an axis, to which one winding each of the line from the internal winding area, as well as from the external winding area, abut when the rotor rotates. The rollers prevent the winding from the internal area to be forced too firmly against the guide, which would block it. The guide of this known device is expensive, particularly because of the separately placed rollers.

SUMMARY OF THE INVENTION

An object of the invention is to provide a device for the transmission of signals between two terminals which is configured in a simpler manner than the prior art.

This object is fulfilled by the invention in that the guide is made of a single piece, and has radial outward protrusions offset with respect to each other around the entire periphery, but at least on the inside facing the internal winding area.

The guide for this device is made of one piece and therefore simple to construct. It is preferably made of plastic and can be manufactured in a single operation by means of extrusion. No additional parts need to be manufactured nor mounted on the guide. The protrusions provide the guide with an always interrupted peripheral surface with relatively few attachment surfaces or points for the respective winding of the line. In this way the guide effectively prevents the windings from drifting in the radial direction during rotation of the rotor, without the danger of the respective winding becoming jammed in the guide. This is very significant for the internal winding area if its windings "open" in one direction of the rotor, thereby pushing the guide. The protrusions that are offset with respect to each other make it possible for the winding on the guide to bend between two respective protrusions, so that it always remains relatively loose and cannot be pressed flat against the guide along an extended path.

The invention will be fully understood when reference is made to the following detailed description taken in conjunction with the accompanying drawings.

DETAILED DESCRIPTION OF THE INVENTION

The invention is described as including an essentially circular cassette K containing a flat ribbon line 10 with electrical conductors (not shown). However, a line with at least one optical conductor could be used instead of the flat ribbon line 10. A combination line with electrical and optical conductors could also be used. In principle, it is also possible to place two or more lines in the cassette K. Instead of all other possibilities, the following only refers to one flat ribbon line with electrical conductors.

Figure 1:
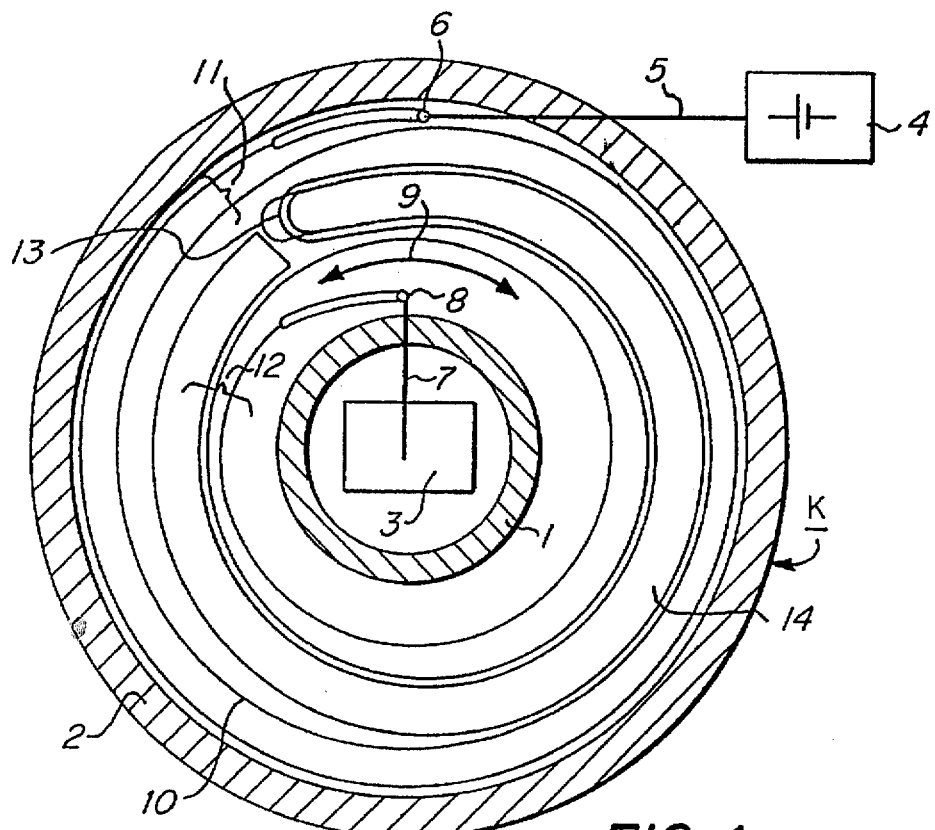
FIG. 1 is a schematically illustrated view of a cassette for the transmission of signals.

FIG. 1 schematically illustrates two circular walls 1 and 2 of the essentially circular cassette K. It is designed to be installed in the steering wheel of a motor vehicle. In the illustrated embodiment, wall 1 belongs to the rotor of cassette K, while wall 2 is a part of its stator. The cassette K is connected to the battery 4 of the motor vehicle, to supply power to the electronics 3 whose signal can trigger an air bag. The battery is connected by an electric line 5 with a terminal 6 configured as a fixed point on the cassette K. The electronics 3 are connected by an electric line 7 to a terminal 8 of the cassette K, which is able to rotate in the direction of double arrow 9. Basically, terminal 8 could be fixed and terminal 6 could be moveable. Both terminals 6 and 8 could also be moveable.

The flat ribbon line 10 with at least two electrical conductors (not shown) is located between the two terminals 6 and 8. The conductors are preferably flat conductors but could also be round conductors. This configuration of the flat ribbon line 10 is particularly thin and therefore occupies very little space. The construction of the flat ribbon line 10 and its type of connection to terminals 6 and 8 are not described in any detail since they are well known in the art.

According to FIG. 1, the flat ribbon line 10 is located in the cassette K between the two terminals 6 and 8 in windings, which are subdivided into an external winding area 11 and an internal winding area 12. The two winding areas 11 and 12 are indicated by brackets. They encompass two to three windings in the middle position or in the installed position of the cassette K shown in FIG. 1. In the two winding areas 11 and 12, the windings of flat ribbon line 10 run in opposite directions. The winding areas 11 and 12 are connected to each other by an approximately U-shaped reversing area 13. A one-piece circular guide 14, which encompasses the reversing area 13, is located between the two winding areas 11 and 12.

The guide 14 can easily move in the peripheral direction of the cassette K, thus in the direction of the double arrow 9. It can be configured as a closed ring with a passage for the reversing area 13 of the flat ribbon line 10. But it can also be an open ring, which extends for nearly 360° as depicted in FIG. 1. The guide 14 is preferably made of plastic. In this way, it is very light, so that it can move easily and almost without noise inside of the cassette K. A more detailed configuration of the guide 14 can be seen in FIGS. 2 to 3. For reasons of simplification, the essentially ring-shaped guide 14 has been uncurled so as to be drawn as a straight body.

Figure 2:
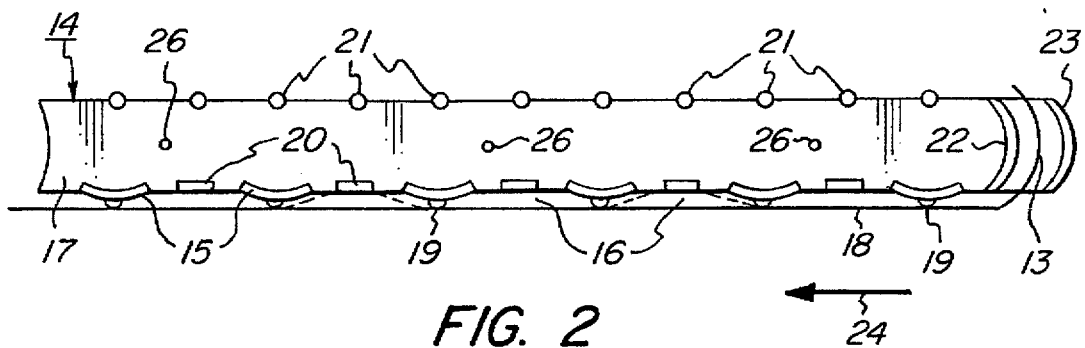
FIG. 2 is a top view of a ring-shaped guide used in the cassette shown in an uncurled state as a straight body for clarity of illustration.
Figure 3:
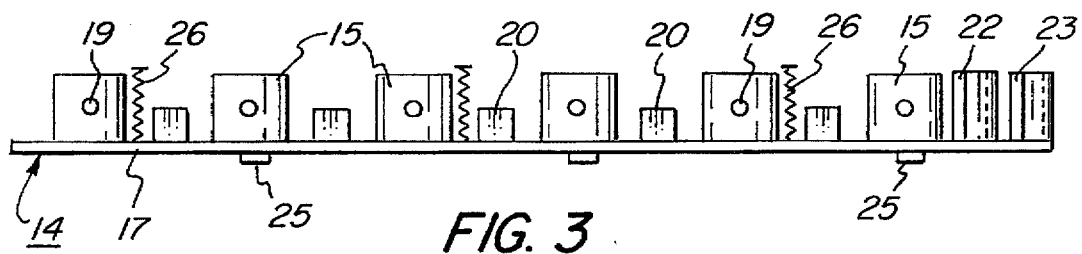
FIG. 3 is a side view of the guide in FIG. 2.

According to FIG. 2, guide 14 has protrusions 15 on the side that faces the internal winding area 12 in the installed position, which are separated from each other by interstices 16. The protrusions 15 are interconnected by a common support 17, which extends along the full length of the guide 14. They extend beyond support 17 in the radial direction, and are preferably bent in a convex shape. This provides just a small contact surface for the winding 18 of the internal winding area 12 illustrated in FIG. 2. The height of the protrusions 15 corresponds to the height of flat ribbon line 10. Outward extending ball-shaped extension 19 can be installed on the protrusions 15, which further reduce the size of the contact surface. In this respect, the protrusions 15 could also be constructed as ball-shaped extension 19 altogether.

The interstices 16 between any two protrusions 15 are of such a size that the winding 18 is able to penetrate into them, but cannot pass through them, as indicated by the broken lines in FIG. 2. This can be achieved with a sufficiently small space between the protrusions 15. However, blocking elements 20, which belong to the guide 14 but are also attached to the support 17, can be provided in the interstices 16.

Protrusions and blocking elements which are separated by interstices can also be installed on the outside of the guide 14 facing the outer winding area 11. In this case, it is sufficient if studs 21 are installed and distributed along the full length of the guide 14, since, in the outer winding area 11, there is no danger for a winding of the flat ribbon line 10 becoming jammed in the guide 14. Here, the guide 14 only needs to prevent a radial excursion of the windings in the outer winding area 11.

In accordance with FIG. 1, the guide 14 is arranged in the cassette K so that it is positioned between the two winding areas 11 and 12. In the installed position, it encompasses the reversing area 13 of the flat ribbon line 10, so that it moves with, or is moved by, a movement of the reversing area 13 in the peripheral direction of the cassette K. To that end, two walls 22 and 23 which are separated from each other by an interstice, can be mounted on the support 17 of guide 14, between which the reversing area 13 of the flat ribbon line 10 is located. When the rotor of the cassette K rotates in one direction, the reversing area 13 fits closely against the wall 22. It then pulls the guide 14 in the direction of arrow 24. In the other direction of rotation of the cassette K rotor, the reversing area 13 makes contact with the wall 23. It then pushes the guide 14 in the opposite direction of arrow 24.

To ensure a low noise movement of guide 14 in the cassette K, small nubs 25 can be installed on its contact side. Spring elements 26 may be installed on support 17 to brace or contact the opposite surface of the cassette K. Nubs 25 and spring elements 26 are uniformly distributed over the length of guide 14. It is useful if the nubs 25 are offset with respect to the spring elements 26 in the peripheral direction.

Figure 4:
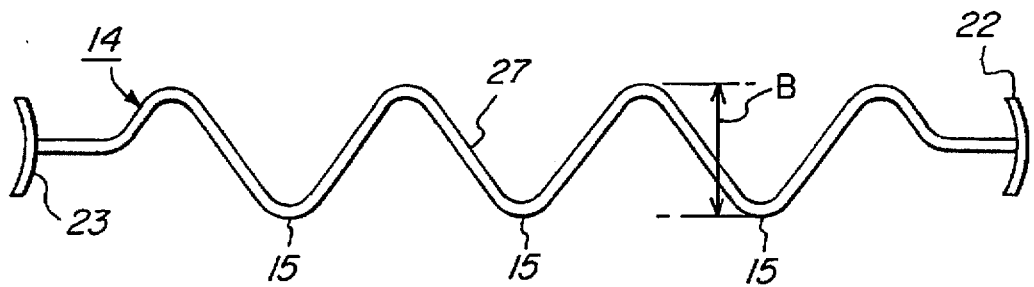
FIGS. 4 to 6 are other configurations of the ring-shaped guide illustrated in the same manner as FIG. 2.

According to FIG. 4, the guide 14 can also be configured as a band 27, which is corrugated in sinusoidal form along its full length. In the operating position, the corrugated band 27 is located edgewise in the cassette K. The walls 22 and 23 are located at the ends of band 27. The resulting width B of guide 14 in FIG. 4 ensues from the corrugation of band 27. The crests of the corrugated waves in band 27 form the protrusions 15 on one of the sides. They replace the rods 21 on the other side.

Figure 5:
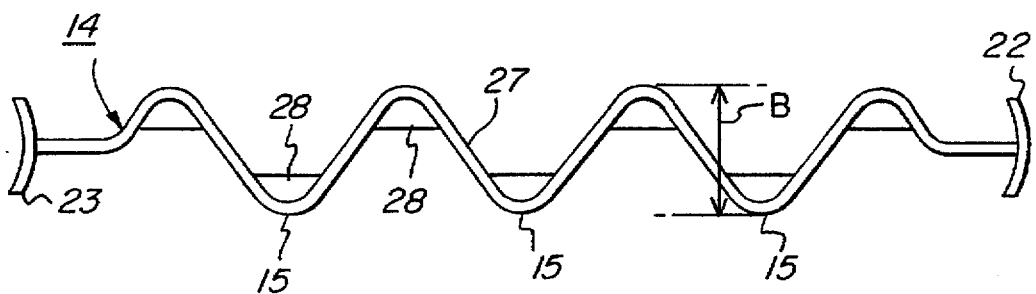

According to FIG. 5, to stabilize the corrugated band 27, transverse walls 28 may be located on one of its front sides in the area of the wave crests, which close off the wave crests and are integrated into the profile of the band 27. The transverse walls 28 are short with respect to the resulting width B of the corrugated band 27, so as not to significantly impair the good flexibility of band 27.

Figure 6:
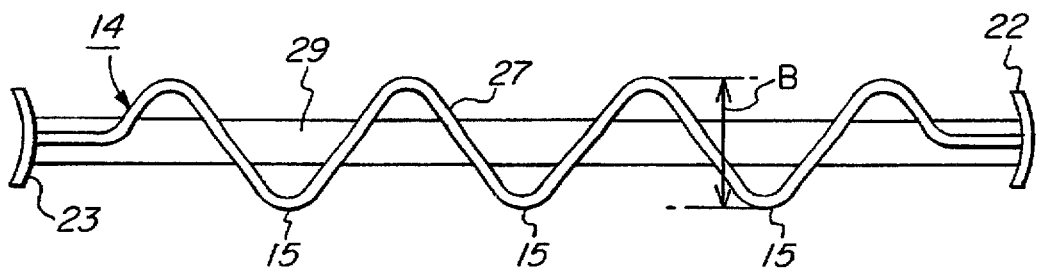

According to FIG. 6, the corrugated band 27 can also be centered on a strip 29 that runs along its full length, which is attached to one of its front ends. The strip 29 is narrower than the resulting width B of the corrugated band 27, so that the wave crests extend on both sides to form the protrusions 15.

To perfectly control the guide 14, a circular indentation can be formed in the cassette K, into which extends either the entire guide 14, or only a protruding part thereof, for example, the support 17 or the strip 29.

The embodiments described above admirably achieve the objects of the invention. However, it will be appreciated that departures can be made by those skilled in the art without departing from the spirit and scope of the invention which is limited only by the following claims.

What is claimed is:

1. A device for the transmission of signals between two terminals, the device comprising:

(a) a cassette having a stator and a rotor, the rotor mounted for rotation around its axis relative to the stator;

(b) a one-piece ring-shaped guide mounted within the cassette thereby defining an inner winding area, an outer winding area and a generally U-shaped reversing area for at least one winding line within the cassette, the one-piece ring-shaped guide being moveable in the peripheral direction of the cassette, the one-piece ring-shaped guide includes a flat common support with upstanding protrusions extending normal thereto and being fixedly connected thereto at least on a side that faces the inner winding area, the protrusions are offset with respect to each other in a peripheral direction along the one-piece ring-shaped guide and protrude radially outward along the periphery thereof to provide contact surfaces for at least one winding line within the cassette;

(c) a first terminal on the stator;

(d) a second terminal on the rotor; and (e) at least one winding line connected between the first and second terminals, the at least one winding line having at least one winding in the inner winding area and at least one winding in the outer winding area, the at least one windings of the inner winding area and the outer winding area have different winding directions and are connected in the generally U-shaped reversing area, whereby the protrusions of the one-piece ring-shaped guide provide the contact surfaces for the at least one winding line within the cassette.

2. A device as claimed in claim 1, wherein the protrusions are separated from each other by interstices, through which the windings of the line cannot pass.

3. A device as claimed in claim 2, wherein blocking elements are placed in the interstices between the protrusions, which act as stops.

4. A device as claimed in claim 1, wherein the protrusions are bent convex and their height corresponds to that of at least one winding line.

5. A device as claimed in claim 1, wherein the one-piece ring-shaped guide includes nonrotatable radially extending ball-shaped extensions attached to the protrusions.

6. A device as claimed in claim 1, wherein the one-piece ring-shaped guide includes nonrotatable ball-shaped extensions on the protrusions.

7. A device as claimed in claim 1, wherein the protrusions extend in an axial direction of the one-piece ring-shaped guide.

8. A device as claimed in claim 7, wherein the contact surfaces are convexly-shaped.

9. A device as claimed in claim 1, wherein the contact surfaces are convexly-shaped.

10. A device for the transmission of signals between two terminals, the device comprising:

(a) a cassette having a stator and a rotor, the rotor mounted for rotation around its axis relative to the stator;

(b) a one-piece ring-shaped guide mounted within the cassette thereby defining an inner winding area, an outer winding area and a generally U-shaped reversing area for at least one winding line within the cassette, the one-piece ring-shaped guide being moveable in the peripheral direction of the cassette, the one-piece ring-shaped guide includes protrusions fixedly mounted at least on its side that faces the inner winding area, the protrusions are offset with respect to each other in a peripheral direction along the one-piece ring-shaped guide and protrude radially outward along the periphery thereof to provide contact surfaces for at least one winding line within the cassette;

(c) a first terminal on the stator;

(d) a second terminal on the rotor;

(e) at least one winding line connected between the first and second terminals, the at least one winding line having at least one winding in the inner winding area and at least one winding in the outer winding area, the at least one windings of the inner winding area and the outer winding area have different winding directions and are connected in the generally U-shaped reversing area, whereby the protrusions of the one-piece ring-shaped guide provide the contact surfaces for the at least one winding line within the cassette; and (f) spring elements located on the guide, which lie against the cassette when the cassette is closed.

* * * * *